(12) United States Patent
Mazooji

(10) Patent No.: US 10,193,376 B2
(45) Date of Patent: Jan. 29, 2019

(54) WIRELESS POWER RECEIVER, CHARGING ARRANGEMENT AND METHOD FOR OPERATING A WIRELESS POWER RECEIVER

(71) Applicant: ams AG, Unterpremstaetten (AT)

(72) Inventor: Mohammad R. Mazooji, Cupertino, CA (US)

(73) Assignee: ams AG, Unterpremstaetten (AT)

( * ) Notice: Subject to any disclaimer, the term of this patent is extended or adjusted under 35 U.S.C. 154(b) by 44 days.

(21) Appl. No.: 15/387,533

(22) Filed: Dec. 21, 2016

(65) Prior Publication Data

US 2017/0179755 A1 Jun. 22, 2017

Related U.S. Application Data

(60) Provisional application No. 62/271,224, filed on Dec. 22, 2015.

(30) Foreign Application Priority Data

Feb. 26, 2016 (EP) ..................................... 16157608

(51) Int. Cl.
| | |
|---|---|
| *H02J 7/02* | (2016.01) |
| *H02J 50/10* | (2016.01) |
| *H02J 7/00* | (2006.01) |
| *H02J 50/00* | (2016.01) |
| *H04B 5/00* | (2006.01) |
| *H02J 50/20* | (2016.01) |
| *G06K 19/07* | (2006.01) |

(52) U.S. Cl.
CPC .............. *H02J 7/025* (2013.01); *H02J 50/10* (2016.02); *H02J 50/20* (2016.02); *H04B 5/0031* (2013.01); *H04B 5/0037* (2013.01); *H04B 5/0068* (2013.01); *H04B 5/0081* (2013.01); *G06K 19/0701* (2013.01)

(58) Field of Classification Search
CPC .................................. H02J 7/025; H02J 50/10
USPC .................. 320/108; 307/104; 455/41.1, 573
See application file for complete search history.

(56) References Cited

U.S. PATENT DOCUMENTS

| | | | |
|---|---|---|---|
| 6,282,407 B1 | 8/2001 | Vega et al. | |
| 8,774,263 B2 * | 7/2014 | Forsyth | ................... H04L 27/00 332/112 |
| 8,922,066 B2 * | 12/2014 | Kesler | ................. B60L 11/1812 307/104 |
| 9,130,651 B2 * | 9/2015 | Tabe | ..................... H04B 1/3838 |
| 9,356,811 B2 * | 5/2016 | Greimel-Rechling | ....................... H04L 27/06 |

(Continued)

OTHER PUBLICATIONS

Ams AG, "NFC Payment for MicroSD and SIM", Product Factsheet AS 3922, Feb. 2013, 2 pgs.

(Continued)

*Primary Examiner* — M Baye Diao
(74) *Attorney, Agent, or Firm* — Fish & Richardson P.C.

(57) ABSTRACT

A wireless power receiver (11) comprises an antenna (13), a capacitor (14) having a first terminal permanently connected to a first terminal (16) of the antenna (13) and a second terminal permanently connected to a second terminal (17) of the antenna (13), a first charge switch (18), a rectifier (15) having a first input (19) coupled to the antenna (13) via the first charge switch (18) and having a first output (22), and a communicator unit (35) with a first terminal coupled to the antenna (13).

15 Claims, 5 Drawing Sheets

(56) References Cited

U.S. PATENT DOCUMENTS

| | | | |
|---|---|---|---|
| 9,397,505 B2* | 7/2016 | Lee | H02J 5/005 |
| 2011/0217927 A1 | 9/2011 | Ben-Shalom et al. | |
| 2013/0278072 A1* | 10/2013 | Yoon | G01R 21/00 |
| | | | 307/104 |
| 2014/0001851 A1 | 1/2014 | Murase | |
| 2014/0167704 A1* | 6/2014 | Lafontaine | G01R 25/00 |
| | | | 320/137 |
| 2014/0241555 A1 | 8/2014 | Terlizzi | |
| 2014/0302788 A1 | 10/2014 | McKelvey | |
| 2014/0375256 A1* | 12/2014 | Lee | H02J 5/005 |
| | | | 320/108 |
| 2015/0087228 A1 | 3/2015 | Porat et al. | |
| 2015/0249360 A1 | 9/2015 | Ichikawa | |
| 2016/0056664 A1* | 2/2016 | Partovi | H02J 7/025 |
| | | | 307/104 |
| 2016/0094080 A1* | 3/2016 | Dong | H01M 10/4257 |
| | | | 320/108 |
| 2016/0268834 A1* | 9/2016 | Satyamoorthy | H02J 7/025 |
| 2016/0365753 A1* | 12/2016 | Lee | H02J 50/20 |
| 2017/0127196 A1* | 5/2017 | Blum | H02J 50/80 |

OTHER PUBLICATIONS

Ams AG, "Boosted NFC Analog Front End", Product Factsheet AS 39230, Feb. 2015, 2 pgs.
Ams AG, Application Note AS3911 General Purpose Demo V3.0, Aug. 2014, 51 pgs.
Ams AG, Product Data Sheet AS3911B, v. 1-14, Nov. 2015, 155 pgs.
Ams AG, Product Data Sheet AS3955, Apr. 2015, 111 pgs.
Panasonic, Datasheet AN32258A, v. 2.0, Oct. 2014, 31 pgs.

* cited by examiner

WIRELESS POWER RECEIVER, CHARGING ARRANGEMENT AND METHOD FOR OPERATING A WIRELESS POWER RECEIVER

CROSS-REFERENCES TO RELATED APPLICATIONS

This application claims the benefit of U.S. Provisional Application No. 62/271,224, filed Dec. 22, 2015, and claims priority to European Patent Application No. 16157608.7, filed on Feb. 26, 2016, all of which are hereby incorporated by reference in their entirety for all purposes.

BACKGROUND OF THE INVENTION

The present invention is related to a wireless power receiver, a charging arrangement and a method for operating a wireless power receiver.

A charging arrangement can be used to provide electrical power to a wireless power receiver. A device comprising a wireless power receiver may be used for mobile communication or near-field-communication, abbreviated as NFC. An antenna of the device could be used for communication and for receiving electrical power. However, voltages that can be tapped at the antenna are different during communication in comparison to when the device is being charged.

SUMMARY OF THE INVENTION

In an embodiment, a wireless power receiver comprises an antenna having a first and a second terminal and a capacitor. The capacitor may comprise a first terminal permanently connected to the first terminal of the antenna and a second terminal permanently connected to the second terminal of the antenna. Moreover, the wireless power receiver comprises a first charge switch, a rectifier having a first input coupled to the antenna via the first charge switch and having a first output, and a communicator unit with a first terminal coupled to the antenna.

Advantageously, the first charge switch is able to decouple the antenna from the rectifier. Thus, the rectifier draws power form the antenna only in a charging phase, but not in any communication phase.

In an embodiment, the first input of the rectifier is coupled to the first terminal of the antenna via the first charge switch.

In an embodiment, the first terminal of the communicator unit is coupled to the first or the second terminal of the antenna.

In an embodiment, the wireless power receiver sets the first charge switch in a conducting state in the charging phase. Moreover, the wireless power receiver sets the first charge switch in a non-conducting state in any communication phase, such as an amplifier communication phase.

In an embodiment, the wireless power receiver comprises a second charge switch coupling a second input of the rectifier to the antenna, for example to the second terminal of the antenna.

In an embodiment, the wireless power receiver sets the second charge switch in a conducting state in the charging phase. Moreover, the wireless power receiver sets the second charge switch in a non-conducting state in any communication phase, such as the amplifier communication phase.

In an embodiment, the rectifier comprises a first diode coupling the first input of the rectifier to a first output of the rectifier.

The first diode may be realized as a Shockley diode. Advantageously, a Shockley diode has a low threshold voltage and generates very low power losses.

In an embodiment, the rectifier comprises a second, a third and a fourth diode. The first to the fourth diode are arranged as a full-bridge and couple the first input and a second input of the rectifier to a first output of the rectifier and to a reference potential terminal.

An antenna voltage may be tapped between the first and the second terminal of the antenna. The rectifier may generate a rectified voltage at its first output. Advantageously, the rectifier may be implemented as a full bridge and generates the rectified voltage using positive and negative half waves of the antenna voltage.

In an embodiment, the wireless power receiver comprises a power management unit having an input coupled to the first output of the rectifier and a battery coupled to a first output of the power management unit.

In an embodiment, the wireless power receiver comprises a resistor having a first terminal coupled to the first terminal of the antenna and a second terminal coupled to the second terminal of the antenna. The value of the resistor may be selected to set a quality factor of the antenna to a predetermined value.

In an embodiment, the wireless power receiver comprises a resistor having a first terminal directly and permanently connected to the first terminal of the antenna and a second terminal directly and permanently connected to the second terminal of the antenna.

In an embodiment, the wireless power receiver comprises a first communicator switch coupling the first terminal of the communicator unit to the antenna, for example to the first or the second terminal of the antenna.

In an embodiment, the wireless power receiver sets the first communicator switch in a non-conducting state in the charging phase. Moreover, the wireless power receiver sets the first communicator switch in a conducting state in the amplifier communication phase.

In an embodiment, the wireless power receiver comprises a second communicator switch coupling a second terminal of the communicator unit to the antenna, for example to the first or the second terminal of the antenna.

In an embodiment, the first communicator switch couples the first terminal of the communicator unit to the second terminal of the antenna and the second communicator switch couples the second terminal of the communicator unit to the first terminal of the antenna.

In an embodiment, the wireless power receiver sets the second communicator switch in a non-conducting state in the charging phase. Moreover, the wireless power receiver sets the second communicator switch in a conducting state in the amplifier communication phase.

In an embodiment, the communicator unit comprises an amplifier circuit having an output amplifier. An output of the output amplifier is coupled to the first terminal of the communicator unit. The amplifier circuit may form the analog-front-end or active-front-end, abbreviated AFE, of the communicator unit.

In an embodiment, the communicator unit comprises an amplifier circuit having an input amplifier. An input of the input amplifier is coupled to the first terminal of the communicator unit.

The output of the output amplifier may be connected to the input of the input amplifier.

In an embodiment, the wireless power receiver is configured for a passive load-modulation-amplitude method.

Load-modulation-amplitude or passive load-modulation-amplitude may be abbreviated as LMA.

In an embodiment, the communicator unit comprises a communicator circuit. The communicator circuit may be coupled to the amplifier circuit to control the amplifier circuit by data output signals and to receive data input signals from the amplifier circuit. The amplifier circuit is not part of the communicator circuit.

In an embodiment, the wireless power receiver comprises a first bypass switch. The first bypass switch couples a first bypass terminal of the communicator circuit to the antenna, for example to the first or the second terminal of the antenna.

In an embodiment, the wireless power receiver sets the first bypass switch in a non-conducting state in the amplifier communication phase and/or the charging phase. Moreover, the wireless power sets the first bypass switch in a conducting state in any communication phase, such as a bypass communication phase and/or the amplifier communication phase.

In an embodiment, the wireless power receiver sets the first and/or the second charge switch in a non-conducting state in the bypass communication phase. The first and/or the second charge switch decouple the antenna from the rectifier in the bypass communication phase.

In an embodiment, the wireless power receiver sets the first and/or the second communicator switch in a non-conducting state in the bypass communication phase.

In an embodiment, the wireless power receiver comprises a second bypass switch. The second bypass switch couples a second bypass terminal of the communicator circuit to the antenna, for example to the first or the second terminal of the antenna.

In an embodiment, the first bypass switch couples the first bypass terminal to the first terminal of the antenna and the second bypass switch couples the second bypass terminal to the second terminal of the antenna.

The communicator circuit may comprise an AFE that is connected to the first and/or the second bypass terminal.

In an embodiment, the wireless power receiver sets the second bypass switch in a non-conducting state in the amplifier communication phase and/or the charging phase. Moreover, the wireless power sets the second bypass switch in a conducting state in the bypass communication phase.

In an embodiment, a battery voltage is tapped at the battery of the wireless power receiver. The battery voltage is higher than a predetermined threshold value in the amplifier communication phase. The battery voltage is equal or lower than the predetermined threshold value in the bypass communication phase.

In an embodiment, the wireless power receiver starts the amplifier communication phase, only if the battery voltage is higher than the predetermined threshold value. The wireless power receiver starts the bypass communication phase, only if the battery voltage is equal or lower than the predetermined threshold value.

In an embodiment, the wireless power receiver is configured for an active-load-modulation method, abbreviated ALM method.

In an embodiment, the wireless power receiver comprises a matching network arranged between the communicator unit and the antenna. The matching network may couple the first terminal of the communicator unit to the first and/or the second terminal of the antenna. The matching network may be a passive circuit. The matching network may be free of switches.

In an embodiment, the matching network comprises an electromagnetic interference filter.

In an embodiment, a charging arrangement comprises the wireless power receiver and a power transmitting unit having a further antenna.

In an embodiment, according to a method for operation of a wireless power receiver, a first charge switch is arranged between an antenna and a rectifier and is set in a conducting state in a charging phase and in a non-conducting state in an amplifier communication phase. The wireless power receiver comprises the first charge switch, the rectifier, the antenna, a communicator unit coupled to the antenna and a capacitor having a first terminal permanently connected to a first terminal of the antenna and a second terminal permanently connected to a second terminal of the antenna.

Advantageously, the first charge switch decouples the antenna from the rectifier in the amplifier communication phase.

The charging arrangement may be realized as a near-field-communication wireless charger, abbreviated as NFC wireless charger. NFC is the abbreviation for near field communication.

The wireless power receiver may be configured for NFC.

Advantageously, the charging arrangement is capable of providing enough usable power for wearables and small electronic devices due to its efficiency. Only a relatively small antenna is required. In the frequency band of NFC that is the 13.56 MHz band, some advantages are achieved due to high frequency. In this band, it is possible to use small antennas with good efficiency. One antenna is on the receiver side, the power receiving unit, abbreviated PRU, and a further antenna is on the transmitter side, the power transmitting unit, abbreviated PTU. The charging arrangement uses a single antenna on the PRU side and a single antenna on the PTU side to accomplish both communication and charging in the NFC band. The wireless power receiver is free of a second antenna besides the antenna. Also, the PTU is free of a second antenna besides the further antenna.

In the charging arrangement, communication and charging will be alternated in time to allow regulatory compliance. Since both communication and charging use for example the frequency 13.56 MHz, a much lower power is used during communication to achieve regulatory compliance. Communication is based on established NFC standards. During the charging phase, there are no emissions limitations as long as the field is not modulated.

The wireless power receiver is configured to avoid NFC waveform distortions. Otherwise these distortions may cause communication problems, particularly for binary phase shift keying modulations, abbreviated BPSK modulations. Communication holes may be formed within the operating volume, and outside of these holes communication may be slowed down. The charging arrangement avoids these effects by switching-in the rectifiers only when they are needed for charging. A separate pair of bypass switches bypass an active-load-modulation booster, in case such a booster is used. Active load modulation is abbreviated as ALM.

The single parallel capacitor tunes the antenna to the proper frequency. The capacitor is permanently connected to the antenna. Thus, another capacitor that is switched-in parallel to the PRU antenna for charging is not required. Switching-in of another capacitor would detune the antenna to a lower frequency, and would significantly reduce the power transfer efficiency at 13.56 MHz. The wireless power receiver is able to use the 13.56 MHz frequency band for charging.

The wireless power receiver is designed such that the possible high voltages induced on the NFC antenna do not cause negative effects to an AFE of NFC interface integrated circuits, abbreviates NFC interface ICs or NFiC. Alternatively, the NFiC could incorporate limiters to mitigate the effect of high voltages. However, these limiters would also limit the necessary voltage and power needed for charging. Advantageously, the wireless power receiver uses switches such as the communicator switches or the bypass switches to isolate the AFE of the NFiC from high voltages during charging.

The wireless power receiver decouples the rectifier from the communication circuit such as the communicator unit. The wireless power receiver may comprise switches on both sides of the antenna. The wireless power receiver avoids communication holes and slowdown and, thus, improves BPSK modulation schemes. In this way no path to the ground exists through the rectifier during any communication phase. When a path to ground would exist through one of the rectifying diodes, the waveforms generated by an ALM booster become distorted.

The charging arrangement can be implemented for at least two possible implementations of NFC devices, the passive and the active front ends. Two approaches exist for NFC communication between a proximity is card, abbreviated as PICC, and a proximity coupling device, abbreviated PCD. The charging arrangement can be designed for LMA and for ALM. Accordingly, two different embodiments may be required to enable a PICC to receive power for charging from a PTU.

For the passive case, it is ensured that the AFE is protected while adequate power is available during the charging phase. The AFE of the passive NFiC is protected against high voltages which can be induced on the receiving antenna during charging. To get around the effects caused by high voltages, the wireless power receiver comprises two communicator switches which isolate the AFE of the wireless power receiver during the charging phase. Thus, the amount of power during the charging phase is not limited by limiters of NFiC to protect their AFE. In case of a LMA realization, the wireless power receiver implements the communicator switches to decouple the NFiC AFE from the antenna during the charging phase. In this way, the wireless power receiver accomplishes the two tasks of protecting the NFiC AFE and of enabling charging of batteries.

For the ALM case, the wireless power receiver is designed such that a communication is possible when the battery is completely depleted, and such that a wave distortion by the rectifying diodes during the PRU transmission is avoided. For the case of ALM, the wireless power receiver is configured to bypass the AFE, when the device battery is completely depleted so that communication can take place between a PICC needing charge and a PTU capable of transmitting charge. Two sets of controlled switches are implemented in the wireless power charger. The first pair of switches, named bypass switches, bypass the ALM front end, and the second pair of switches, named charge switches, connect the rectifying diodes for the charging phase of the operation. Thus, a waveform distortion during ALM operation by any connection of the rectifying diodes to the antenna is avoided.

BRIEF DESCRIPTION OF THE DRAWINGS

The following description of figures of exemplary embodiments may further illustrate and explain the invention. Circuit parts, devices and circuit blocks with the same structure and the same effect, respectively, appear with equivalent reference symbols. In so far as circuit parts, devices or circuit blocks correspond to one another in terms of their function in different figures, the description thereof is not repeated for each of the following figures.

DETAILED DESCRIPTION

Figure 1A:
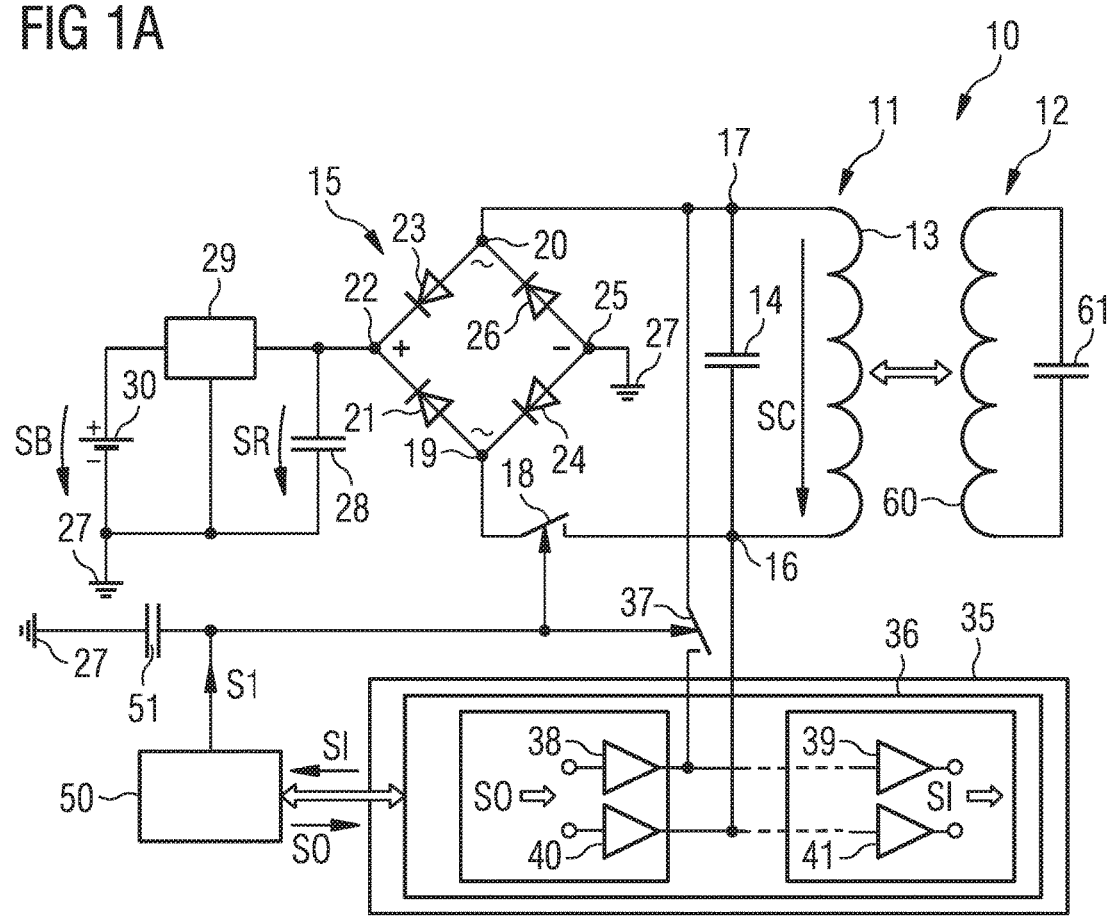
FIGS. 1A and 1B show exemplary embodiments of a charging arrangement with a wireless power receiver.

FIG. 1 shows an exemplary embodiment of a charging arrangement 10 comprising a wireless power receiver 11, abbreviated as receiver. Moreover, the charging arrangement 10 comprises a power transmitting unit 12, abbreviated as PTU. The receiver 11 comprises an antenna 13, a capacitor 14 and a rectifier 15. A first terminal 16 of the antenna 13 is connected to a first terminal of the capacitor 14. Correspondingly, a second terminal 17 of the antenna 13 is connected to a second terminal of the capacitor 14. The connection of the first terminal 16 of the antenna 13 to the first terminal of the capacitor 14 and the connection of the second terminal 17 of the antenna 13 to the second terminal of the capacitor 14 are permanent. Moreover, these two connections are direct. These two connections are free from a switch. These two connections may be free from a further capacitor.

The rectifier 15 is coupled to the first and the second terminal 16, 17 of the antenna 13. Moreover, the receiver 11 comprises a first charge switch 18 that is arranged between the antenna 13 and the rectifier 15. Thus, the first terminal 16 of the antenna 13 is coupled via the first charge switch 18 to a first input 19 of the rectifier 15. The second terminal 17 of the antenna 13 is connected to a second input 20 of the rectifier 15. Said connection may be implemented without a switch.

The rectifier 15 comprises a first diode 21. The first diode 21 couples the first input 19 of the rectifier 15 to a first output 22 of the rectifier 15. Moreover, the rectifier 15 comprises a second diode 23 that couples the second input 20 of the rectifier 15 to the first output 22 of the rectifier 15. Additionally, a third diode 24 of the rectifier 15 couples a second output 25 of the rectifier 15 to the first input 19 of the rectifier 15. Furthermore, a fourth diode 26 couples the second output 25 of the rectifier 15 to the second input 20 of the rectifier 15. The second output 25 of the rectifier 15 is connected to a reference potential terminal 27. The first to the fourth diode 21, 23, 24, 26 may be implemented as Shockley diodes. The first to the fourth diode 21, 23, 24, 26 each have an anode and a cathode. The first and the second diode 21, 23 are arranged such that their anodes are connected to the first output 22 of the rectifier 15. The third and the fourth diode 24, 26 are arranged such that their cathodes are connected to the second output 25 of the rectifier 15. The first to the fourth diode 21, 23, 24, 26 form a full-bridge.

Moreover, the first output 22 of the rectifier 15 is coupled via a charging capacitor 28 to the reference potential terminal 27. The receiver 11 comprises a power management unit 29 that is connected on its input side to the first output 22 of the rectifier 15. The receiver 11 comprises a battery 30 that couples an output of the power management unit 29 to the reference potential terminal 27. The power management unit 29 is connected to the reference potential terminal 27.

Additionally, the receiver 11 comprises a communicator unit 35 coupled to the antenna 13. The communicator unit 35 comprises an amplifier circuit 36 coupled to the antenna 13. The receiver 11 comprises a first communicator switch 37 arranged between the communicator unit 35 and the antenna 13. Thus, a first terminal of the amplifier circuit 36 is coupled via a first terminal of the communicator unit 35 and the first communicator switch 37 to the second terminal 17 of the antenna 13. A second terminal of the amplifier circuit 36 is coupled via a second terminal of the communicator unit 35 to the first terminal 16 of the antenna 13.

The amplifier circuit 36 comprises a first output amplifier 38 having an output connected to the first terminal of the amplifier circuit 36 and, thus, to the first terminal of the communicator unit 35. Furthermore, the amplifier circuit 36 comprises a first input amplifier 39 having an input connected to the first terminal of the amplifier circuit 36 and, thus, to the first terminal of the communicator unit 35. Therefore, the input of the first input amplifier 39 is connected to the output of the first output amplifier 38.

Correspondingly, the amplifier circuit 36 comprises a second output amplifier 40 having an output coupled to the second terminal of the amplifier circuit 36 and, thus, to the second terminal of the communicator unit 35. Similarly, a second input amplifier 41 of the amplifier circuit 36 comprises an input that is coupled to the second terminal of the amplifier circuit 36 and, thus, to the second terminal of the communicator unit 35. Therefore, the input of the second input amplifier 41 is connected to the output of the second output amplifier 40. The first and the second output amplifier 38, 40 may be realized as power amplifiers. The first and the second output amplifier 38, 40 may be implemented as rail-to-rail amplifiers. They may be designed as class B amplifiers.

The first and the second input amplifier 39, 41 may be realized as low noise amplifiers. The first and the second input amplifier 39, 41 may be implemented as rail-to-rail amplifiers. They may be designed as class B amplifiers.

The communicator unit 35 may be implemented as a near-field-communication unit, abbreviated NFC communicator. For example, the communicator unit 35 may be implemented as a near-field-communication interface integrated-circuit, abbreviated NFC interface IC or NFiC.

The receiver 11 comprises a microcontroller 50 that is coupled on its output side to a control terminal of the first charge switch 18 and to a control terminal of the first communicator switch 37. One output of the microcontroller 50 may be connected to the control terminal of the first charge switch 18 and to the control terminal of the first communicator switch 37. The receiver 11 comprises a hold capacitor 51 that couples the control terminal of the first charge switch 18 to the reference potential terminal 27. A control signal S1 of the microcontroller 50 is provided to the control terminal of the first charge switch 18 and to the control terminal of the first communicator switch 37.

The first charge switch 18 may be realized as a normally open switch. The first communicator switch 37 is implemented as a normally closed switch. Thus, the first charge switch 18 is in a non-conducting state and the first communicator switch 37 is in a conducting state being controlled by a control signal S1 having 0 Volt. The first charge switch 18 is in a non-conducting state and the first communicator switch 37 is in a conducting state at a first logical value of the control signal S1. The control signal S1 may have zero volt at the first logical value. The first charge switch 18 is in a conducting state and the first communicator switch 37 is in a non-conducting state at a second logical value of the control signal S1. The control signal S1 may have a positive voltage at the second logical value.

The PTU 12 comprises a further antenna 60. Moreover, the PTU 12 comprises a further capacitor 61. A first terminal of the further antenna 60 is connected to a first terminal of the further capacitor 61. A second terminal of the further antenna 60 is connected to a second terminal of the further capacitor 61. The PTU 12 comprises a further resistor 62. The further resistor 62 couples the first terminal of the further antenna 60 to the second terminal of the further antenna 60.

The first charge switch 18 may be implemented as a field-effect transistor, for example as an enhancement-mode field-effect transistor. The first communicator switch 37 may be fabricated as a field-effect transistor, for example as a depletion-mode field-effect transistor.

In a charging phase CA, the PTU 12 provides electrical power to the antenna 13. The first charge switch 18 is in a conducting state in the charging phase CA. Contrary to this the first communicator switch 37 is in a non-conducting state in the charging phase CA. By the connection of the antenna 13 to the rectifier 15 in the charging phase CA, a rectified voltage SR is provided at the first output terminal 22 of the rectifier 15. The power management unit 29 generates a battery voltage SB that is provided to the battery 30 using the rectified voltage SR. An antenna voltage SC is tapped between the first and the second terminal 16, 17 of the antenna 13. Since the first communicator switch 37 is in a non-conducting state during the charging phase CA, the antenna voltage SC—that may have high values—is not provided to the communicator unit 35 and, thus, not to the amplifier circuit 36.

In an amplifier communication phase CO, the first communicator switch 37 is set in a conducting state and the first charge switch 18 is set in a non-conducting state. The PTU 12 provides data signals via the further antenna 60 and the antenna 13 to the amplifier circuit 36. The amplifier circuit 36 generates data input signals SI and provides them to the microcontroller 50. The amplifier communication phase CO could also be named regular or normal or first communication phase.

Furthermore, the microcontroller 50 is able to provide data output signal SO to the communicator unit 35. Thus, the first and the second output amplifier 38, 40 of the amplifier circuit 36 generate a voltage that is provided via the first communicator switch 37 to the antenna 13 depending on the data output signal SO. Data transmitted by the antenna 13 will be received by the further antenna 60 of the PTU 12 or by another signal receiving unit in the amplifier communication phase CO.

Thus, during the amplifier communication phase CO, the antenna voltage SC is not reduced by the rectifier 15. The four diodes 21, 23, 24, 26 of the rectifier 15 do not lead a current in the amplifier communication phase CO. Such a current could reduce a voltage provided by the output amplifiers 38, 40 or an antenna voltage SC received by the antenna 13 and provided to the input amplifiers 39, 41. The receiver 11, and thus the charging arrangement 10, is configured for a passive load-modulation-amplitude method, abbreviated as LMA method.

To provide for high charging power during the charging phase CA and to avoid waveform distortions during transmission, two switches are implemented, the first charge switch 18 and the first communicator switch 37 to isolate the AFE and the charging circuitry during the communication and charging phases CO, CA, respectively. The first charge switch 18 is normally open, while the first communicator switch 37 is normally closed. When the receiver 11 is in the amplifier communication mode, the first charge switch 18 is open, while the first communicator switch 37 is closed. When the receiver 11 is in the charging mode, the first charge switch 18 is closed, while the first communicator switch 37 is open.

The first charge switch 18 and the first communicator switch 37 are simultaneously under the control of the microcontroller 50. The hold capacitor 51 on the control line ensures that the first charge switch 18 and the first communicator switch 37 remain in their desired positions, while the receiver 11 is receiving charge. The receiver 11 is realized as power receiving unit, abbreviated PRU. For a passive PICC, the AFE is protected, while ensuring the available power during charging is not limited for example by a limiter.

Figure 1B:
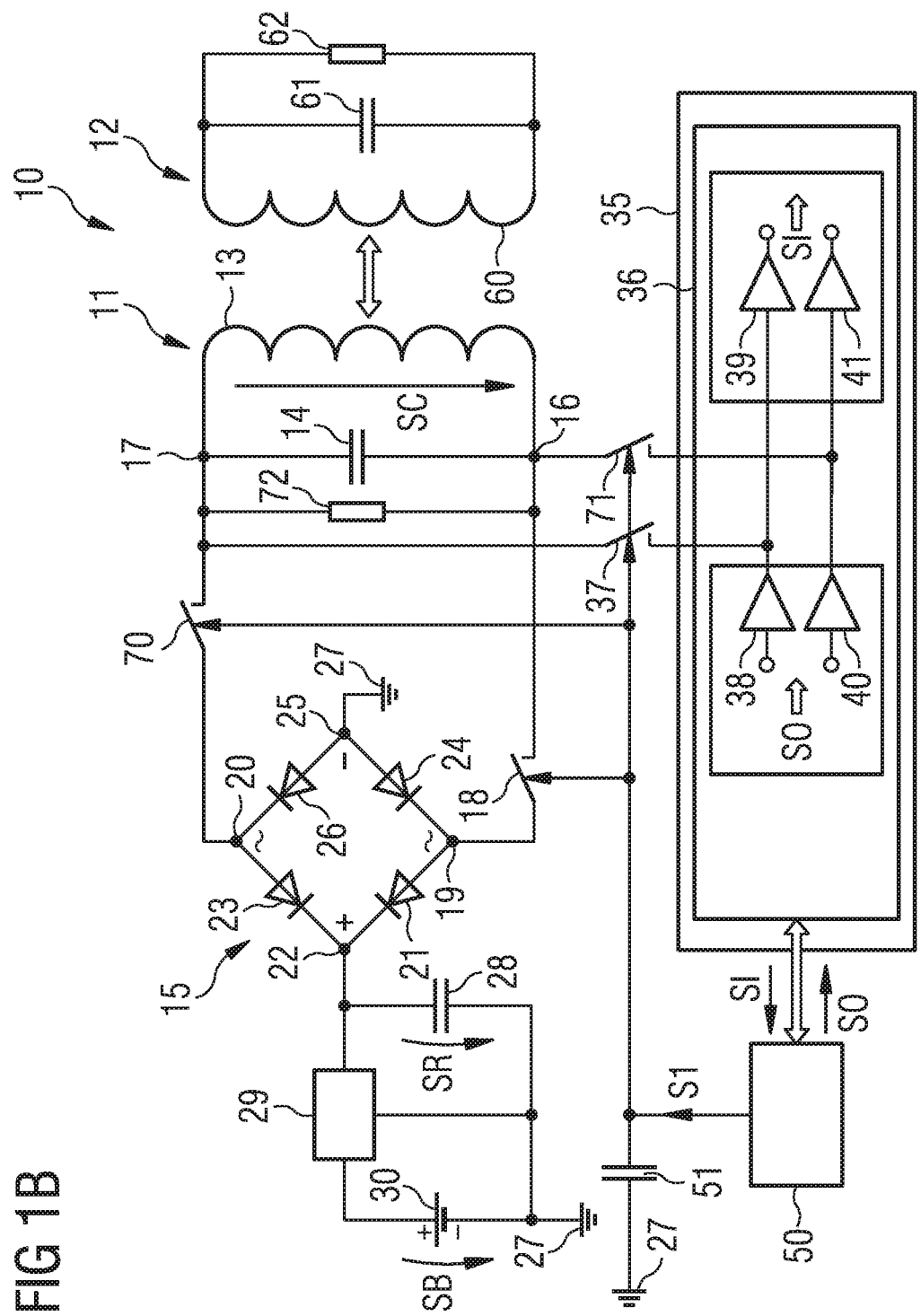

FIG. 1B shows a further exemplary embodiment of the charging arrangement 10 which is a further development of the embodiment shown in FIG. 1A. The receiver 11 comprises a second charge switch 70. The second charge switch 70 is arranged between the antenna 13 and the rectifier 15. The second charge switch 70 couples the second terminal 17 of the antenna 13 to the second input 20 of the rectifier 15.

Additionally, the receiver 11 comprises a second communicator switch 71 that is arranged between the antenna 13 and the communicator unit 35. The second communicator switch 71 couples the first terminal 16 of the antenna 13 to the second terminal of the communicator unit 35 and, thus, to the second terminal of the amplifier circuit 36. The microcontroller 50 is coupled on its output side to the control terminal of the second charge switch 70 and to the control terminal of the second communicator switch 71. The control terminal of the second charge switch 70 may be directly and permanently connected to the control terminal of the first charge switch 18. Similarly, the control terminal of the second communicator switch 71 may be directly and permanently connected to the control terminal of the first communicator switch 37. Thus, the second charge switch 70 is controlled by the same control signal S1 as the first charge switch 18. Similarly, the second communicator switch 71 is controlled by the same control signal S1 as the first communicator switch 37.

The second charge switch 70 may be implemented as a field-effect transistor, for example as an enhancement-mode field-effect transistor. The second communicator switch 71 may be fabricated as a field-effect transistor, for example as a depletion-mode field-effect transistor.

Furthermore, the receiver comprises a resistor 72. The resistor 72 is connected in parallel to the antenna 13. Thus, a first terminal of the resistor 72 is connected to the first terminal 16 of the antenna 13 and a second terminal of the resistor 72 is connected to the second terminal 17 of the antenna 13. The resistor 72 is designed for adjusting the quality factor of the antenna 13.

Advantageously, the antenna 13 is isolation from the rectifier 15 by the first and the second charge switch 18, 70 in the amplifier communication phase CO. The antenna 13 is isolated from the amplifier circuit 36 by the first and the second communicator switch 37, 71 during the charging phase CA.

The charging arrangement 10 is configured for a passive load-modulation-amplitude method, abbreviated LMA method. The receiver 11, as shown in FIGS. 1A and 1B, is implemented for the LMA method.

In the case of a passive proximity integrated circuit card, abbreviated passive PICC, the AFE is protected against high voltages required during charging. The receiver 11 realizes this without including a limiter specifically designed to protect the AFE. The amount of power available for charging the battery 30 is high, since the receiver 11 is free of a limiter that could significantly reduce the amount of power.

Alternatively, the capacitor 14 may be replaced by a series circuit of the capacitor 14 and a second capacitor.

Figure 2A:
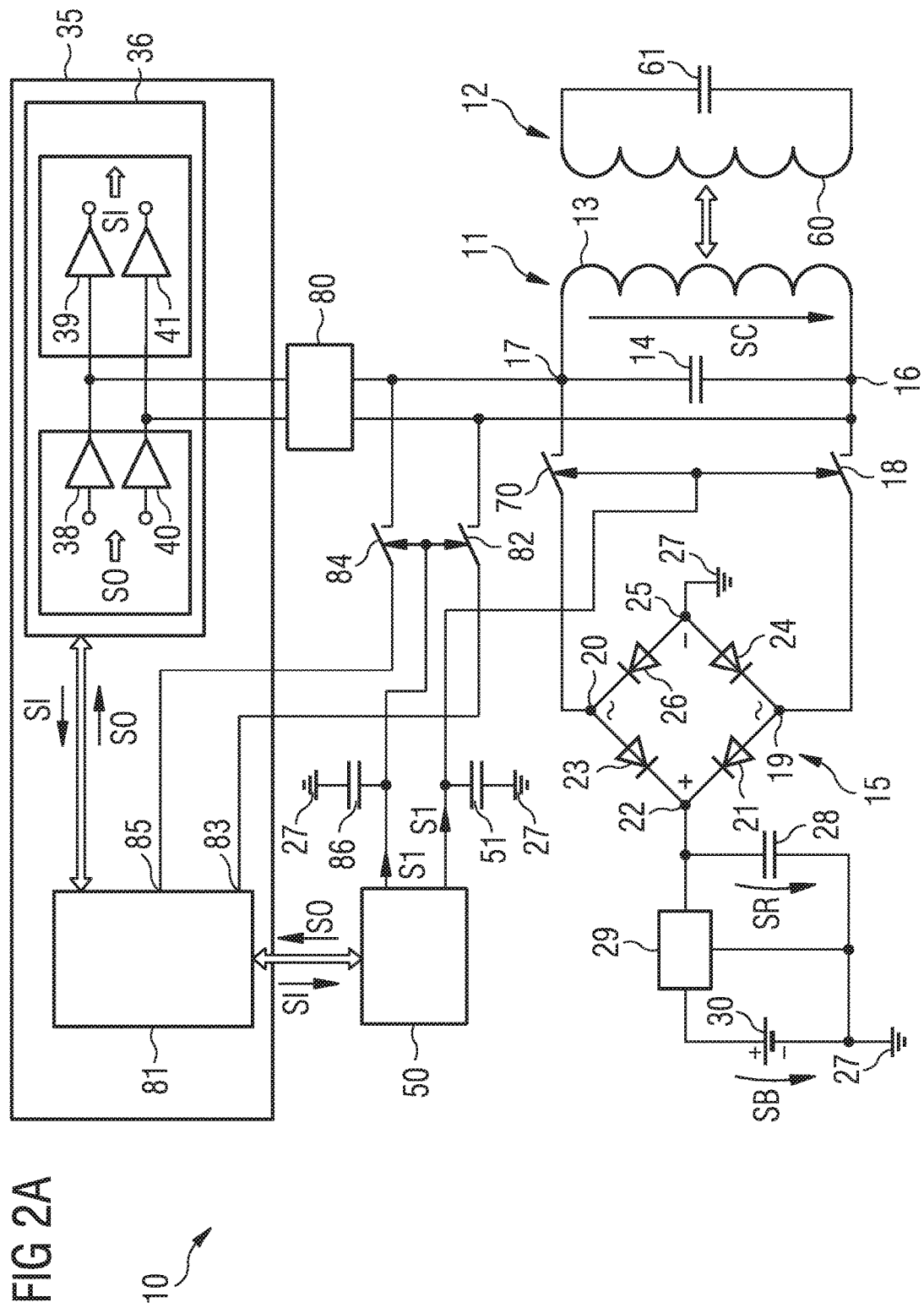
FIGS. 2A and 2B show further exemplary embodiments of a charging arrangement with a wireless power receiver.
Figure 2B:
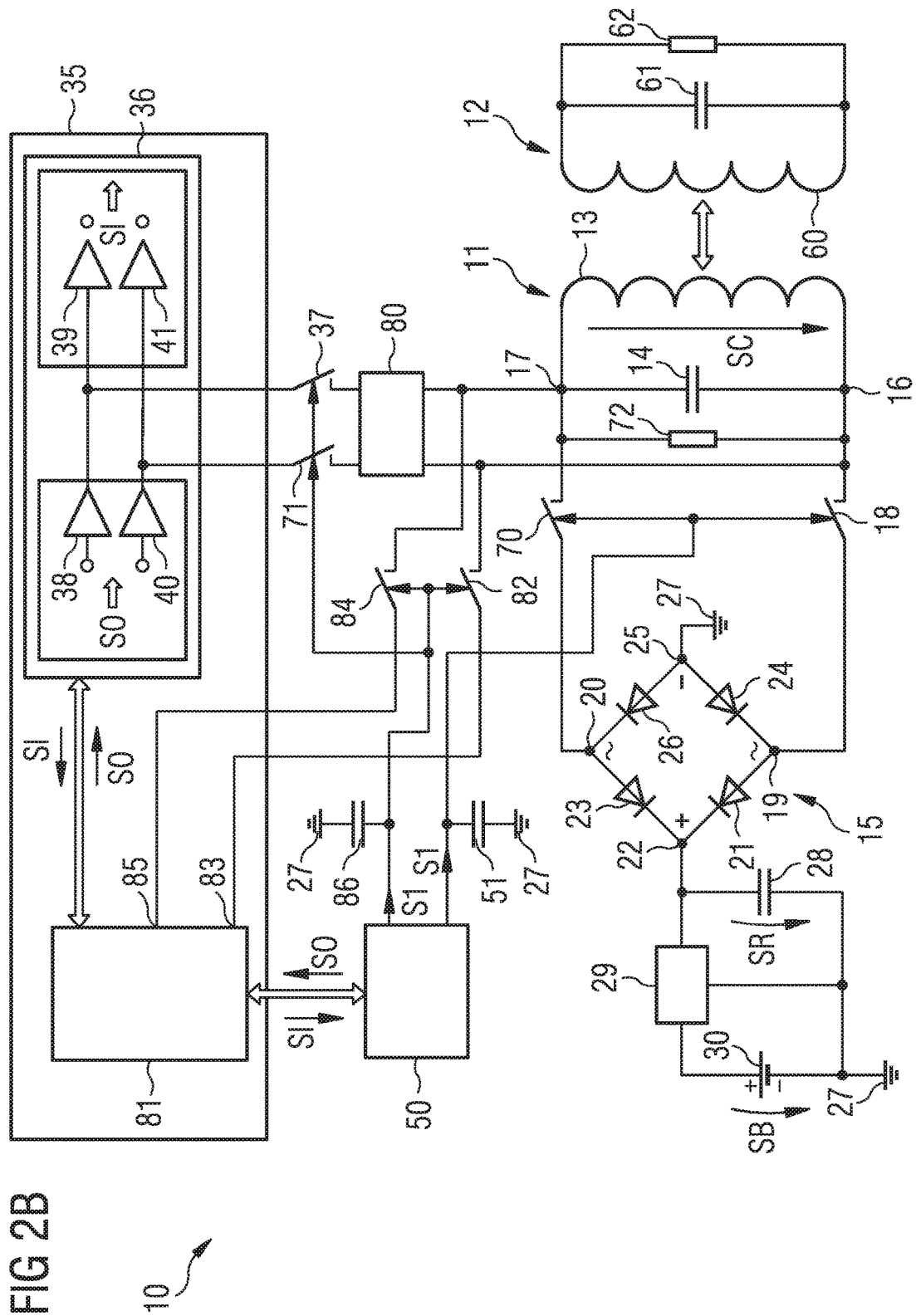

FIG. 2A shows a further exemplary embodiment of the charging arrangement 10 which is a further development of the embodiments shown in FIGS. 1A and 1B. The receiver 11, as shown in FIGS. 2A and 2B, may be implemented for the active-load-modulation method.

The receiver 11 comprises a matching network 80 that couples the antenna 13 to the communicator unit 35 and, thus, to the amplifier circuit 36. The first and the second terminal 16, 17 of the antenna 13 are coupled by the matching network 80 to the first and the second terminal of the communicator unit 35 and, thus, to the first and the second terminal of the amplifier circuit 36. The first and the second output amplifiers 38, 40 provide their signals via the matching network 80 to the antenna 13. Correspondingly, the first and the second input amplifiers 39, 41 receive the signals from the antenna 13 via the matching network 80. In one embodiment, the connections between the amplifier circuit 36 and the antenna 13 may be realized without a switch such as the first and/or the second communicator switch 37, 71.

Moreover, the communicator unit 35 comprises a communicator circuit 81. The communicator circuit 81 is coupled to the amplifier circuit 36. Thus, the communicator circuit 81 provides signals to the inputs of the first and the second output amplifier 38, 40 such as data output signals SO. Said data output signals SO are used by the amplifier circuit 36 to provide a signal via the matching network 80 and the antenna 13 to the PTU 12 or another receiving unit. Additionally, the communicator circuit 81 receives data input signals SI derived from signals generated by the first and the second input amplifiers 39, 41. The communicator circuit 81 is coupled to the microcontroller 50 for receiving the data output signals SO and for providing the data input signals SI.

Additionally, the receiver 11 comprises a first bypass switch 82 that couples the antenna 13 to the communicator circuit 81. For example, the first bypass switch 82 may be arranged between the first terminal 16 of the antenna 13 and a first bypass terminal 83 of the communicator circuit 81. The receiver 11 comprises a second bypass switch 84 that couples the antenna 13 to the communicator circuit 81. The second bypass switch 84 may be arranged between the second terminal 17 of the antenna 13 and the second bypass terminal 85 of the communicator circuit 81.

The microcontroller 50 comprises a further output that is connected to a control terminal of the first bypass switch 82 and to a control terminal of the second bypass switch 84. The control terminal of the first bypass switch 82 is directly connected to the control terminal of the second bypass switch 84. A bypass capacitor 86 couples the control terminal of the first bypass switch 82 to the reference potential terminal 27. The first and the second bypass switch 82, 84 are realized as normally closed switches. The first and the second bypass switch 82, 84 are in a conducting state, if a voltage of approximately zero volt is provided to the control terminals. The first and the second bypass switch 82, 84 are realized as field-effect transistors. These two switches may be implemented as depletion-mode field-effect transistors. The first control signal S1 may be provided to the first and the second bypass switch 82, 84 and to the first and the second charge switch 18, 70 by the microcontroller 50.

The amplifier circuit 36 may be implemented as a NFC booster.

In an alternative, not shown embodiment, the first control signal S1 is provided to the first and the second charge switch 18, 70. A further control signal is provided to the first and the second bypass switch 82, 84 by the microcontroller 50. The further control signal may be different from the first control signal.

FIG. 2B shows a further exemplary embodiment of the charging arrangement 10 which is a further development of the embodiments shown in FIGS. 1A, 1B and 2A. The receiver 11 comprises the first and the second communicator switch 37, 71. Thus, the amplifier circuit 36 is coupled via the first and the second communicator switch 37, 71 and via the matching network 80 to the antenna 13. The matching network 80 is connected to the first and the second terminal 16, 17 of the antenna 13. The first and the second communicator switch 37, 71 are connected to the first and the second terminal of the amplifier circuit 36.

In an alternative, not shown embodiment, the positions of the matching network 80 and of the first and the second communicator switch 37, 71 are interchanged.

The charging arrangement 10 operates in the ALM mode. At least three operation modes or operation phases exist.

In the charging phase CA, the first and the second charge switch 18, 70 are in a conducting state. Moreover, in the charging phase CA, the first and the second communicator switch 37, 71 are in a non-conducting state. Additionally, in the charging phase CA, the first and the second bypass switch 82, 84 are in a non-conducting state.

In the amplifier communication phase CO, the first and the second charge switch 18, 70 are in a non-conducting state. Moreover, in the amplifier communication phase CO, the first and the second communicator switch 37, 71 are in a conducting state. Additionally, in the amplifier communication phase CO, the first and the second bypass switch 82, 84 are in a non-conducting state.

In a bypass communication phase CB, the first and the second charge switch 18, 70 are in a non-conducting state. Moreover, in the bypass communication phase CB, the first and the second communicator switch 37, 71 are in a non-conducting state. Additionally, in the bypass communication phase CB, the first and the second bypass switch 82, 84 are in a conducting state.

The microcontroller 50 sets the receiver 11 in the amplifier communication phase CO, if a battery voltage SB tapped at the battery 30 is higher than a predetermined threshold voltage. The microcontroller 50 sets the receiver 11 in the bypass communication phase CB, if the battery voltage SB is equal or less than the predetermined voltage value.

The resistor 72 is connected in parallel to the capacitor 14. Thus, the first terminal of the resistor 72 is connected to the first terminal of the capacitor 14 and the second terminal of the resistor 72 is connected to the second terminal of the capacitor 14.

The charging arrangement 10 is configured for NFC charging with ALM. In the case of a PICC using ALM, the charging arrangement 10 uses a scheme which allows the receiver 11 to communicate, even when the battery 30 is completely depleted. For this reason, a set of bypass switches 82, 84 that are normally closed switches is used that would bypass the booster, when the battery 30 is depleted. While the passive NFiC is incapable of communicating with a point-of-sale reader, abbreviated PoS reader, for payment, it is capable of communicating with a charge providing PTU 12, when both the PTU 12 and the receiver 11 use the same size antenna 13, 60. The antenna 13 and the further antenna 60 have an approximately equal size. The frequency characteristics of the antenna 13 and the further antenna 60 match to each other.

A set of switches, namely the first and the second charge switch 18, 70 are incorporated so that the charging circuitry 15, 28, 29, 30 is completely disconnected from the antenna 13 during any communication phase. Additionally, the ALM receiver 11 mitigates waveform distortions during its transmission. The first and the second charge switch 18, 70 are normally open switches.

When the PICC is in communication mode, the microcontroller 50 applies the control signal S1 to the bypass switches 82, 84 so that they are opened, and the receiver 11 can use the antenna circuitry to make payments etc. The control signal S1 may also be provided to the first and the second charge switch 18, 70 and/or the first and the second communicator switch 37, 71 by the microcontroller 50. When the battery voltage SB fall below the threshold level, the bypass switches 82, 84 stay closed and any communication is directly bypassed to the NFC communicator 81 or NFiC. Once the receiver 11 completes charging negotiations with the PTU 12, the control signal S1 can simultaneously close the first and the second charge switch 18, 70 and open the first and the second bypass switch 82, 84, while the receiver 11 receives charge for its battery 30. Adequately large enough capacitors 28, 86 on the control lines are charged so that the charge switches 18, 70 and the bypass switches 82, 84 can be kept in their desired positions during charging.

For an active PICC booster ALM, it is ensured that communication is possible even when the battery 30 is completely depleted. Moreover, for an active PICC booster ALM, it is ensured that the rectifying diodes 21, 23, 24, 26 do not cause signal distortion during the PICC transmission.

In an alternative, not shown embodiment, the first control signal S1 is provided to the first and the second charge switch 18, 70. A further control signal is provided to the first and the second bypass switch 82, 84 by the microcontroller 50. The further control signal may be different from the first control signal. The first and the second communicator switch 37, 71 may be controlled by the further control signal or by an additional control signal provided by the microcontroller 50 via a further output of the microcontroller 50 and a further connection line. The additional control signal may be different from the first and the further control signal.

Figure 3:
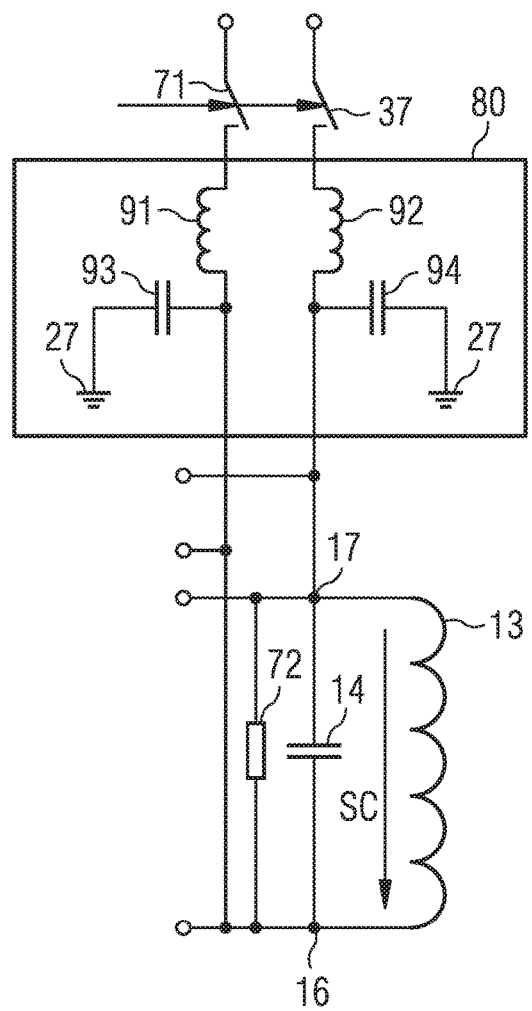
FIG. 3 shows an exemplary embodiment of a matching network and FIGS. 4A and 4B show exemplary embodiments of phases in a charging arrangement.

FIG. 3 shows an exemplary embodiment of the matching network 80 that can be used for the realization of the charging arrangement 10 shown in FIGS. 2A and 2B. The matching network 80 is designed as an electromagnetic interference filter, abbreviated as EMI filter. The matching network 80 comprises a first and a second network inductor 91, 92 that couple an input of the matching network 82 to an output of the matching network 80. The first network inductor 91 couples the first terminal 16 of the antenna 13 to the second communicator switch 71. Correspondingly, the second network inductor 92 couples the second terminal 17 of the antenna 13 to the first communicator switch 37.

Additionally, the matching network 80 comprises a first and a second network capacitor 93, 94. The first network capacitor 93 couples a node between the first network inductor 91 and the first terminal 16 of the antenna 13 to the reference potential terminal 27. Similarly, the second network capacitor 94 couples a node between the second network inductor 92 and the second terminal 17 of the antenna 13 to the reference potential terminal 27.

Alternatively, the matching network 80 and the EMI filter may be realized by other circuits.

Alternatively, the matching network 80 is arranged at another place in the receiver 11. The matching network 80 may be between the antenna 13 and the bypass switches 82, 84 or may be between the communicator switches 37, 71 and the communicator unit 35.

Figure 4A:
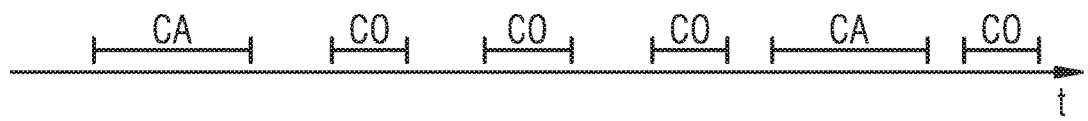

FIG. 4A shows exemplary phases in the exemplary embodiments of the charging arrangement 10, as shown in FIGS. 1A and 1B. The phases are shown as a function of a time t. The receiver 11 may operate in the amplifier communication phase CO or in the charging phase CA or may be idle.

Figure 4B:
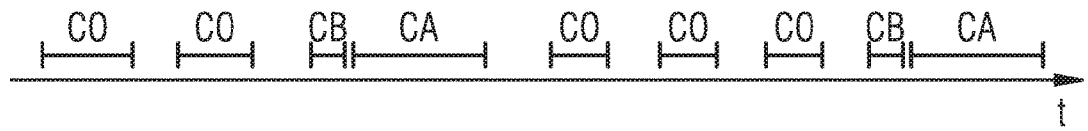

FIG. 4B shows exemplary phases in the exemplary embodiments of the charging arrangement 10, as shown in FIGS. 2A and 2B. The receiver 11 may operate in the amplifier communication phase CO, in the bypass communication phase CB or in the charging phase CA or may be idle. When the battery voltage SB drops below a predetermined voltage value, the receiver 11 is able to perform a bypass operation phase CB, but is not able to perform an amplifier communication phase CO. Optionally, the charging phase CA directly follows the bypass operation phase CB.

I claim:

1. A wireless power receiver, comprising:
   an antenna;
   a capacitor having a first terminal permanently connected to a first terminal of the antenna and a second terminal permanently connected to a second terminal of the antenna;
   a first charge switch;
   a rectifier having a first input coupled to the antenna via the first charge switch and having a first output; and
   a communicator unit with a first terminal coupled to the antenna,
   wherein the communicator unit comprises an amplifier circuit having a first output amplifier and a first input amplifier, and
   wherein an output of the first output amplifier and an input of the first input amplifier are coupled to the first terminal of the communicator unit.

2. The wireless power receiver according to claim 1, wherein the rectifier comprises a first diode coupling the first input of the rectifier to the first output of the rectifier.

3. The wireless power receiver according to claim 1, comprising a resistor having a first terminal coupled to the first terminal of the antenna and a second terminal coupled to the second terminal of the antenna.

4. The wireless power receiver according to claim 1, wherein the wireless power receiver is configured for a passive load-modulation-amplitude method.

5. The wireless power receiver according to claim 1, comprising a matching network arranged between the first terminal of the communicator unit and the antenna.

6. A charging arrangement, comprising:
   a wireless power receiver according to claim 1; and
   a power transmitting unit having a further antenna.

7. A wireless power receiver, comprising:
   an antenna;
   a capacitor having a first terminal permanently connected to a first terminal of the antenna and a second terminal permanently connected to a second terminal of the antenna;
   a first charge switch;
   a rectifier having a first input coupled to the antenna via the first charge switch and having a first output;
   a communicator unit with a first terminal coupled to the antenna; and
   a first communicator switch coupling the first terminal of the communicator unit to the antenna.

8. The wireless power receiver according to claim 7, wherein the wireless power receiver is designed
   to set the first charge switch in a conducting state and the first communicator switch in a non-conducting state in a charging phase and
   to set the first charge switch in a non-conducting state and the first communicator switch in a conducting state in an amplifier communication phase.

9. A wireless power receiver, comprising:
   an antenna;
   a capacitor having a first terminal permanently connected to a first terminal of the antenna and a second terminal permanently connected to a second terminal of the antenna;
   a first charge switch;
   a rectifier having a first input coupled to the antenna via the first charge switch and having a first output; and
   a communicator unit with a first terminal coupled to the antenna,
   wherein the wireless power receiver comprises a first bypass switch,
   wherein the communicator unit comprises a communicator circuit, and
   wherein the first bypass switch couples the antenna to a first bypass terminal of the communicator circuit.

10. The wireless power receiver according to claim 9, wherein the wireless power receiver is designed
    to set the first bypass switch in a non-conducting state and the first communicator switch in a conducting state in an amplifier communication phase, and
    to set the first bypass switch in a conducting state and the first communicator switch in a non-conducting state in a bypass communication phase.

11. The wireless power receiver according to claim 10, wherein a battery voltage of a battery of the wireless power receiver is higher than a predetermined threshold value in the amplifier communication phase and the battery voltage is equal or lower than the predetermined threshold value in the bypass communication phase.

12. The wireless power receiver according to claim 10, wherein the wireless power receiver is designed
    to set the first bypass switch and the first communicator switch in a non-conducting state and the first charge switch in a conducting state in a charging phase, and
    to set the first charge switch in a non-conducting state in the bypass communication phase and the amplifier communication phase.

13. The wireless power receiver according to claim 9, wherein the wireless power receiver is configured for an active-load-modulation method.

14. A method for operation of a wireless power receiver, wherein a first charge switch is arranged between an antenna and a rectifier and is set in a conducting state in a charging phase and in a non-conducting state in an amplifier communication phase,
    wherein the wireless power receiver comprises the first charge switch, the rectifier, the antenna, a communicator unit coupled to the antenna and a capacitor having a first terminal permanently connected to a first terminal of the antenna and a second terminal permanently connected to a second terminal of the antenna,
    wherein the communicator unit comprises an amplifier circuit having a first output amplifier and a first input amplifier, and wherein an output of the first output amplifier and an input of the first input amplifier are coupled to the first terminal of the communicator unit.

15. A wireless power receiver, comprising:
an antenna;
a capacitor having a first terminal permanently connected to a first terminal of the antenna and a second terminal permanently connected to a second terminal of the antenna;
a first charge switch;
a rectifier having a first input coupled to the antenna via the first charge switch and having a first output;
a power management unit having an input coupled to the first output of the rectifier;
a battery coupled to a first output of the power management unit;
a first communicator switch; and
a communicator unit with a first terminal coupled via the first communicator switch to the antenna.

* * * * *